(12) United States Patent
Uradnisheck et al.

(10) Patent No.: US 7,595,363 B2
(45) Date of Patent: *Sep. 29, 2009

(54) TOUGHENED POLY(HYDROXYALKANOIC ACID) COMPOSITIONS

(75) Inventors: Julius Uradnisheck, Glen Mills, PA (US); Edmund Arthur Flexman, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 230 days.

This patent is subject to a terminal disclaimer.

(21) Appl. No.: 11/516,949

(22) Filed: Sep. 7, 2006

(65) Prior Publication Data

US 2007/0213466 A1   Sep. 13, 2007

Related U.S. Application Data

(63) Continuation-in-part of application No. 11/395,422, filed on Mar. 31, 2006, now Pat. No. 7,381,772, which is a continuation-in-part of application No. 10/996,899, filed on Nov. 23, 2004, now Pat. No. 7,354,973.

(60) Provisional application No. 60/529,208, filed on Dec. 12, 2003.

(51) Int. Cl.
*C08L 29/10* (2006.01)
(52) U.S. Cl. .............. 525/162; 525/163; 525/166; 525/176; 525/191; 525/417; 525/419
(58) Field of Classification Search .............. 525/163, 525/162, 166, 191, 176, 417, 419
See application file for complete search history.

(56) References Cited

U.S. PATENT DOCUMENTS

| | | | |
|---|---|---|---|
| 3,264,272 A | 8/1966 | Rees | |
| 4,187,358 A | 2/1980 | Kyo | |
| 4,753,980 A | 6/1988 | Deyrup | |
| 4,912,167 A | 3/1990 | Deyrup | |
| 5,498,650 A | 3/1996 | Flexman | |
| 6,943,214 B2 | 9/2005 | Flexman | |
| 7,268,190 B2 * | 9/2007 | Ohme et al. | 525/400 |
| 7,354,973 B2 * | 4/2008 | Flexman | 525/162 |
| 7,381,772 B2 * | 6/2008 | Flexman et al. | 525/163 |
| 2004/0242803 A1 | 12/2004 | Ohme | |
| 2005/0151296 A1 | 7/2005 | Obuchi | |

FOREIGN PATENT DOCUMENTS

| | | |
|---|---|---|
| JP | 9316310 | 12/1997 |
| JP | 2005255722 | 9/2005 |
| JP | 2006077063 | 3/2006 |
| WO | WO 0023520 A1 | 4/2000 |
| WO | WO 03014224 A1 | 2/2003 |
| WO | WO 03082980 A1 | 10/2003 |
| WO | 2005059031 A1 | 6/2005 |
| WO | WO 2004101642 A1 | 11/2005 |

OTHER PUBLICATIONS

International Search Report for International application No. PCT/US2007/019620, dated Feb. 25, 2008.

* cited by examiner

*Primary Examiner*—Bernard Lipman

(57) ABSTRACT

Disclosed are toughened poly(hydroxyalkanoic acid) resin compositions comprising poly(hydroxyalkanoic acid), such as polylactic acid, and an impact modifier comprising an ethylene copolymer made from monomers (a) ethylene; (b) one or more olefins of the formula $CH_2=C(R^1)CO_2R^2$, where $R^1$ is hydrogen or an alkyl group with 2-8 carbon atoms and $R^2$ is an alkyl group with 1-8 carbon atoms, such as methyl, ethyl, or butyl; and (c) one or more olefins of the formula $CH_2=C(R^3)CO_2R^4$, where $R^3$ is hydrogen or an alkyl group with 1-6 carbon atoms, such as methyl, and $R^4$ is glycidyl. The ethylene copolymer may further be made from carbon monoxide monomers. The compositions may further comprise one or more ethylene/acrylate and/or ethylene/vinyl ester polymers, ionomers, and cationic agents.

20 Claims, No Drawings

TOUGHENED POLY(HYDROXYALKANOIC ACID) COMPOSITIONS

This application is a continuation-in-part of U.S. application Ser. No. 11/395,422, filed Mar. 31, 2006, which is a continuation in-part of U.S. application Ser. No. 10/996,899, filed Nov. 23, 2004, which claims the benefit of U.S. Provisional Application No. 60/529,208, filed Dec. 12, 2003. The entire disclosures of all prior parent applications are herein incorporated by reference.

The invention relates to thermoplastic poly(hydroxyalkanoic acid) compositions toughened with a random ethylene copolymer comprising glycidyl groups.

BACKGROUND OF THE INVENTION

Poly(hydroxyalkanoic acid) (PHA) polymers such as poly (lactic acid) (PLA) can be polymerized from renewable sources rather than petroleum and are compostable. They have a broad range of industrial and biomedical applications. However, physical limitations such as brittleness and slow crystallization may prevent easy injection molding of PHAs into articles that have an acceptable degree of toughness for many applications. Extruded amorphous sheeting may also be too brittle for handling in continuous moving equipment without breakage.

It is desirable in the present invention to obtain a toughener for PHAs that allows PHA compositions to be easily melt-processed into a variety of articles with an acceptable level of toughness.

Japanese patent application publication H9-316310 discloses a poly(lactic acid) resin composition comprising PLA and modified olefin compounds. Examples of those modified olefin compounds are ethylene-glycidyl methacrylate copolymers grafted with polystyrene, poly(dimethyl methacrylate), etc. and copolymers of ethylene and alpha-olefins grafted with maleic anhydride and maleimide.

SUMMARY OF THE INVENTION

The invention provides a poly(hydroxyalkanoic acid) composition comprising (i) about 60 to about 99.5 or about 60 to about 97 weight % of poly(hydroxyalkanoic acid) and (ii) about 0.5 to about 40 weight % of an impact modifier comprising an ethylene copolymer derived from copolymerizing, based on the total weight of total comonomers, (a) about 20 to about 95 weight % ethylene, (b) about 3 to about 70 weight % of one or more olefins of the formula $CH_2=C(R^1)CO_2R^2$, (c) about 0.5 to about 25 weight % of one or more olefins of the formula $H_2=C(R^3)CO_2R^4$, and optionally (d) 0 to about 20 weight % carbon monoxide where $R^1$ is hydrogen or an alkyl group with 1-8 carbon atoms, $R^2$ is an alkyl group with 1-8 carbon atoms, where $R^3$ is hydrogen or an alkyl group with 1-6 carbon atoms, $R^4$ is glycidyl, the weight % of the poly (lactic acid) and the impact modifier are based on the total weight of the poly(lactic acid) and the impact modifier, and the weight % of ethylene, $CH_2=C(R^1)CO_2R^2$, or $H_2=C(R^3)CO_2R^4$ is based on the modifier or copolymer weight.

DETAILED DESCRIPTION OF THE INVENTION

All references disclosed herein are incorporated by reference.

"Copolymer" means polymers containing two or more different monomers. The terms "dipolymer" and "terpolymer" mean polymers containing only two and three different monomers respectively. The phrase "copolymer of various monomers" means a copolymer whose units are derived from the various monomers.

Compostable polymers are those that are degradable under composting conditions. They break down under the action of organisms (annelids) and microorganisms (bacteria, fungi, algae), achieve total mineralization (conversion into carbon dioxide, methane, water, inorganic compounds or biomass under aerobic conditions) at a high rate and are compatible with the composting process.

Biodegradable polymers are those that are capable of undergoing decomposition into carbon dioxide, methane, water, inorganic compounds or biomass in which the predominant mechanism is the enzymatic action of microorganisms that can be measured by standardized tests, in a specified time, reflecting available disposal conditions.

Renewable polymers are those that comprise or are prepared from raw or starting materials that are or can be replenished sooner than within a few years (unlike petroleum which requires thousands or millions of years), such as by fermentation and other processes that convert biological materials into feedstock or into the final renewable polymer.

Poly(hydroxyalkanoic acid) polymers are biodegradable polymers. A number of these are also available from processing renewable resources, such as production by bacterial fermentation processes or isolated from plant matter that include corn, sweet potatoes, and the like.

The invention provides a toughened thermoplastic composition comprising poly(hydroxyalkanoic acid) and an impact modifier. The impact modifier may comprise a random ethylene copolymer and, optionally, other tougheners.

Poly(hydroxyalkanoic acid) compositions include polymers prepared from polymerization of hydroxyalkanoic acids having from 2 to 7 (or more) carbon atoms, including the polymer comprising 6-hydroxyhexanoic acid, also known as polycaprolactone (PCL), and polymers comprising 3-hydroxyhexanoic acid, 4-hydroxyhexanoic acid and 3-hydroxyheptanoic acid. Of note are poly(hydroxyalkanoic acid) comprising hydroxyalkanoic acids having five or fewer carbon atoms, for example, polymers comprising glycolic acid, lactic acid, 3-hydroxypropionate, 2-hydroxybutyrate, 3-hydroxybutyrate, 4-hydroxybutyrate, 3-hydroxyvalerate, 4-hydroxyvalerate and 5-hydroxyvalerate. Notable polymers include poly(glycolic acid) (PGA), poly(lactic acid) (PLA) and poly (hydroxybutyrate) (PHB). PHA compositions also include blends of two or more PHA polymers, such as a blend of PHB and PCL.

Polyhydroxyalkanoic acids can be produced by bulk polymerization. A poly(hydroxyalkanoic acid) may be synthesized through the dehydration-polycondensation of the hydroxyalkanoic acid. A PHA may also be synthesized through the dealcoholization-polycondensation of an alkyl ester of polyglycolic acid or by ring-opening polymerization of a cyclic derivative such as the corresponding lactone or cyclic dimeric ester. The bulk polymerization is usually carried out by two production processes, i.e., a continuous process and a batch process. Japanese Patent Laid-Open No. (JP-A) 03-502115 discloses a process wherein bulk polymerization for cyclic esters is carried out in a twin-screw extruder. JP-A 07-26001 discloses a process for the polymerization for biodegradable polymers, wherein a bimolecular cyclic ester of hydroxycarboxylic acid and one or more lactones are continuously fed to a continuous reaction apparatus having a static mixer for ring-opening polymerization. JP-A 07-53684 discloses a process for the continuous polymerization for aliphatic polyesters, wherein a cyclic dimer of hydroxycarboxylic acid is fed together with a catalyst to an initial polymerization step, and then continuously fed to a subsequent polymerization step built up of a multiple screw kneader. U.S. Pat. No. 2,668,162 and U.S. Pat. No. 3,297,033 describe batch processes.

PHA polymers also include copolymers comprising more than one PHA, such as polyhydroxybutyrate-hydroxyvalerate (PHB/V) copolymers and copolymers of glycolic acid and lactic acid (PGA/LA). Copolymers can be prepared by catalyzed copolymerization of a polyhydroxyalkanoic acid or derivative with one or more cyclic esters and/or dimeric cyclic esters. Such comonomers include glycolide (1,4-dioxane-2,5-dione), the dimeric cyclic ester of glycolic acid; lactide (3,6-dimethyl-1,4-dioxane-2,5-dione); α,α-dimethyl-β-propiolactone, the cyclic ester of 2,2-dimethyl-3-hydroxy-propanoic acid; β-butyrolactone, the cyclic ester of 3-hydroxy-butyric acid, δ-valerolactone, the cyclic ester of 5-hydroxypentanoic acid; ε-caprolactone, the cyclic ester of 6-hydroxyhexanoic acid, and the lactone of its methyl substituted derivatives, such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc., the cyclic ester of 12-hydroxydodecanoic acid, and 2-p-dioxanone, and the cyclic ester of 2-(2-hydroxyethyl)-glycolic acid.

PHA compositions also include copolymers of one or more PHA monomers or derivatives with other comonomers, including aliphatic and aromatic diacid and diol monomers such as succinic acid, adipic acid, and terephthalic acid and ethylene glycol, 1,3-propanediol, and 1,4-butanediol. Around 100 different monomers have been incorporated into PHA polymers.

PHA polymers and copolymers may also be made by living organisms or isolated from plant matter. Numerous microorganisms have the ability to accumulate intracellular reserves of PHA polymers. For example, the copolymer poly(3-hydroxybutyrate-co-3-hydroxyvalerate) (PHB/V) has been produced by fermentation of the bacterium *Ralstonia eutropha*. Fermentation and recovery processes for other PHA types have also been developed using a range of bacteria including *Azotobacter, Alcaligenes latus, Comamonas testosterone* and genetically engineered *E. coli* and *Klebsiella*. U.S. Pat. No. 6,323,010 discloses a number of PHA copolymers prepared from genetically modified organisms.

When used herein, the term "poly(hydroxyalkanoic acid)" refers to a polymer or composition comprising any homopolymer or copolymer comprising a hydroxyalkanoic acid and mixtures thereof, such as those homopolymers, copolymers and blends listed above. Likewise, when a specific hydroxyalkanoic acid is used in such a term, such as poly(glycolic acid), poly(lactic acid) (PLA) or poly(hydroxybutyrate), the term includes homopolymers, copolymers or blends comprising the hydroxyalkanoic acid used in the term.

Glycolic acid is derived from sugar cane. Poly(glycolic acid) can be synthesized by the ring-opening polymerization of glycolide and is sometimes referred to as poly-glycolide.

Poly(lactic acid) (PLA) includes poly(lactic acid) homopolymers and copolymers of lactic acid and other monomers containing at least 50 mole % of repeat units derived from lactic acid or its derivatives and mixtures thereof having a number average molecular weight of 3,000 to 1,000,000, 10,000 to 700,000, or 20,000 to 600,000. The poly(lactic acid) may contain at least 70 mole % of repeat units derived from (e.g. made by) lactic acid or its derivatives. The poly(lactic acid) homopolymers and copolymers can be derived from d-lactic acid, l-lactic acid, or a mixture thereof. A mixture of two or more poly(lactic acid) polymers can be used. Poly(lactic acid) may be prepared by the catalyzed ring-opening polymerization of the dimeric cyclic ester of lactic acid, which is referred to as "lactide." As a result, poly(lactic acid) is also referred to as "polylactide."

Copolymers of lactic acid are typically prepared by catalyzed copolymerization of lactic acid, lactide or another lactic acid derivative with one or more cyclic esters and/or dimeric cyclic esters as described above.

The PHA may comprise up to about 99.8 weight %, of the composition, based on the total amount of PHA and impact modifier used. For example, the PHA may be present in a range from a lower limit of 60, 70, 80, 85 90 or 95 to an upper limit of 97, 99, 99.5 or 99.8 weight %.

As used herein, the term "ethylene copolymer" refers to a polymer derived from (e.g. made from) ethylene and at least one or two additional monomers.

The impact modifier can be present in the composition from about 0.5 to about 40, about 3 to about 40, about 0.5 to about 30, about 0.2 to about 20, about 0.5 to about 15, about 0.5 to about 3, about 1 to about 15, about 1 to about 10, or about 1 to about 5, weight %.

The ethylene copolymer impact modifier is at least one polymer made by polymerizing monomers (a) ethylene; (b) one or more olefins of the formula $CH_2=C(R^1)CO_2R^2$, where $R^1$ is hydrogen or an alkyl group with 1-8 carbon atoms and $R^2$ is an alkyl group with 1-8 carbon atoms, such as methyl, ethyl, or butyl; and (c) one or more olefins of the formula $CH_2=C(R^3)CO_2R^4$, where $R^3$ is hydrogen or an alkyl group with 1-6 carbon atoms, such as methyl, and $R^4$ is glycidyl. Monomers (b) can be butyl acrylates. One or more of n-butyl acrylate, tert-butyl acrylate, iso-butyl acrylate, and sec-butyl acrylate may be used. An example of an ethylene copolymer is derived from ethylene, butyl acrylate, and glycidyl methacrylate and referred to as EBAGMA. Repeat units derived from monomer (a) may comprise about 20 to about 95 weight %, about 20 to about 90 weight %, about 40 to about 90 weight %, or about 50 to 80 weight % of the of the total weight of the ethylene copolymer. Repeat units derived from monomer (b) may comprise about 3 to about 70 weight %, about 3 to about 40 weight %, about 15 to about 35 weight %, or about 20 to about 35 weight % of the total weight of the ethylene copolymer. Repeat units derived from monomer (c) may comprise about 0.5 to about 25 weight %, about 2 to about 20 weight %, or about 3 to about 17 weight % of the total weight of the ethylene copolymer.

The ethylene copolymer derived from the monomers (a) to (c) above may additionally be derived from (d) carbon monoxide (CO) monomers. When present, repeat units derived from carbon monoxide may comprise up to about 20 weight % or about 3 to about 15 weight % of the total weight of the ethylene copolymer.

The ethylene copolymers used in the composition preferably are random copolymers that can be prepared by direct polymerization of the foregoing monomers in the presence of a free-radical polymerization initiator at elevated temperatures, about 100 to about 270° C. or about 130 to about 230° C., and at elevated pressures, at least about 70 MPa or about 140 to about 350 MPa. The ethylene copolymers may also be prepared using a tubular process, an autoclave, or a combination thereof, or other suitable processes. The ethylene copolymers may be not fully uniform in repeat unit composition throughout the polymer chain due to imperfect mixing during polymerization or variable monomer concentrations during the course of the polymerization. The ethylene copolymers are not grafted or otherwise modified post-polymerization.

The impact modifier may further comprise one or more copolymers of ethylene and an acrylate ester such ethyl acrylate or butyl acrylate or a vinyl ester such as vinyl acetate in up to about 90 weight %, alternatively up to about 75 weight %, based on the total weight of the impact modifier. For example, an ethylene alkyl acylate copolymer, such as an ethylene/methyl acrylate copolymer, may be present from about 1 to about 90 weight %, about 5 to about 75 weight %, or about 10 to about 50 weight %, based on the total weight of the impact modifier. When used, the copolymers of ethylene and an acrylate ester or vinyl acetate may be present about 1 to about 50 weight %, about 5 to about 40 weight %, or about 10 to about 30 weight %, based on the total weight of the impact modifier.

The impact modifier may further comprise at least one optional ionomer toughening agent. By an ionomer is meant a carboxyl group containing polymer that has been neutralized or partially neutralized with metal cations such as zinc, manganese(II), magnesium, cadmium, tin(II), cobalt(II), antimony(II), or sodium, or lithium and the like. Examples of ionomers are described in U.S. Pat. Nos. 3,264,272 and 4,187,358. Examples of suitable carboxyl group containing polymers include, but are not limited to, ethylene/acrylic acid copolymers and ethylene/methacrylic acid copolymers. The carboxyl group containing polymers may also be derived from one or more additional monomer, such as, but not limited to, butyl acrylate. Zinc salts can be neutralizing agents. Ionomers are commercially available from E. I. du Pont de Nemours and Company, Wilmington, DE (DuPont). When used, the ionomers may be present from about 0.5 to about 75 weight %, from about 1 to about 75 weight %, from about 5 to about 60 weight %, or from about 10 to about 50 weight %, based on the total weight of the impact modifier. For some purposes, such as when used in films, the ionomers may be present from about 0.5 to about 10 weight %, based on the total weight of the impact modifier. It may be desirable to use less than 5 weight %, or less than 1 weight %, of the ionomer, based on the total weight of the impact modifier, to maintain suitable viscosity and minimize formation of gels or other film defects.

The composition may further comprise at least one optional cationic catalyst. Such catalysts are described in U.S. Pat. No. 4,912,167 and are sources of catalytic cations such as $Al^{3+}$, $Cd^{2+}$, $Co^{2+}$, $Cu^{2+}$, $Fe^{2+}$, $In^{3+}$, $Mn^{2+}$, $Nd^{3+}$, $Sb^{3+}$, $Sn^{2+}$, and $Zn^{2+}$. Suitable catalysts include, but are not limited to, salts of hydrocarbon mono-, di-, or polycarboxylic acids, such as acetic acid and stearic acid. Inorganic salts such as carbonates may also be used. Examples of catalysts include, but are not limited to, stannous octanoate, zinc stearate, zinc carbonate, and zinc diacetate (hydrated or anhydrous). When used, the cationic catalyst may comprise about 0.01 to about 3 parts by weight per hundred parts by weight of PHA and impact modifier.

The compositions may also optionally further comprise other additives such as about 0.5 to about 5 weight % plasticizer; about 0.1 to about 5 weight % antioxidants and stabilizers; about 3 to about 40 weight % fillers; about 5 to about 40 weight % reinforcing agents; about 0.5 to about 10 weight % nanocomposite reinforcing agents; and/or about 1 to about 40 weight % flame retardants. Examples of suitable fillers include glass fibers and minerals such as precipitated $CaCO_3$, talc, and wollastonite.

The composition can be prepared by melt blending the PHA and ethylene copolymer until they are homogeneously dispersed to the naked eye and do not delaminate upon injection molding. Other materials (e.g. ethylene-acrylate copolymers, ionomers, grafting agents, and other additives) may be also uniformly dispersed in the PHA-ethylene copolymer matrix. The blend may be obtained by combining the component materials using any melt-mixing method known in the art. For example: 1) the component materials may be mixed to homogeneity using a melt-mixer such as a single or twin-screw extruder, blender, kneader, Banbury mixer, roll mixer, etc., to give a resin composition; or 2) a portion of the component materials can be mixed in a melt-mixer, and the rest of the component materials subsequently added and further melt-mixed until homogeneous.

Also disclosed is an article comprising or producing from the composition disclosed herein. The composition may be molded into articles using any suitable melt-processing technique. Commonly used melt-molding methods known in the art such as injection molding, extrusion molding, or blow molding. The compositions may be formed into films and sheets by extrusion to prepare both cast and blown films. These sheets may be further thermoformed into articles and structures that may be oriented from the melt or at a later stage in the processing of the composition. The compositions may also be used to form fibers and filaments that may be oriented from the melt or at a later stage in the processing of the composition. Examples of articles that may be formed from the compositions include, but are not limited to, knobs, buttons, disposable eating utensils, films, thermoformable sheeting and the like. Parisons used in blow molding containers may be prepared by injection molding. Blow molded containers include bottles, jars and the like. Films and sheets can be used to prepare packaging materials and containers such as pouches, lidding, thermoformed containers such as trays, cups, and bowls. Other thermoformed packaging articles include blister packaging, blister components or pharmaceutical compartments for dispensers, clam shells, handling-trays, point-of-purchase display stands, two-pieces boxes (lid and base combinations), dispenser bodies, bifoldable articles, and the like.

EXAMPLES

Compounding: The compositions of the examples were prepared by compounding in a 28 mm or 30 mm co-rotating Werner & Pfleiderer twin screw extruder with a screw design comprising two hard working segments followed by a vacuum port and twin hole die. The molten material was discharged into a water quench tank prior to being cut by a strand cutter.

Molding: Molding was done on a 6-ounce reciprocating screw molding machine into an ASTM mold that made a single 1/8" tensile bar and two 5"×1/8" flexural bars using a screw speed of 60 rpm, a fast injection rate, and a back pressure of 50 psi.

Notched Izod impact strength measurements were made according to ASTM D256. Each 1/8" flexural bar was cut in half and each half was notched in the middle and tested.

Materials Used: PLA-1 used in the following examples was a poly(lactic acid) homopolymer with an inherent viscosity of 1.49 as measured in 1:1 TFA/methylene chloride at 0.4 g/deciliter at 23° C. It contains minor amounts of normal commercial additives. PLA-2 is a poly(lactic acid) with a melting point of about 165° C. available as NATUREWORKS LLC 3001D.

EBAGMA-5 was an ethylene/n-butyl acrylate/glycidyl methacrylate terpolymer derived from 66.75 weight % ethylene, 28 weight % n-butyl acrylate, and 5.25 weight % glycidyl methacrylate. It had a melt index of 12 g/10 minutes as measured by ASTM method D1238.

EBAGMA-12 was an ethylene/n-butyl acrylate/glycidyl methacrylate terpolymer derived from 66 weight % ethylene, 22 weight % n-butyl acrylate, and 12 weight % glycidyl methacrylate. It had a melt index of 8 g/10 minutes as measured by ASTM method D1238.

EBAGMA-17 was an ethylene/n-butyl acrylate/glycidyl methacrylate terpolymer derived from 63 weight % ethylene, 20 weight % n-butyl acrylate, and 17 weight % glycidyl methacrylate. It had a melt index of 15 g/10 minutes as measured by ASTM method D1238.

E/GMA was an ethylene/glycidyl methacrylate copolymer derived from 98.2 weight % ethylene and 1.8 weight % glycidyl methacrylate.

E/BA was an ethylene/butyl acrylate copolymer derived from 27 weight % butyl acrylate and 73 weight % ethylene.

EPDM was a polymer derived from 68 weight % ethylene, 28 weight % propylene, and 4 weight % 1,3-hexadiene and having a Mooney viscosity $ML_4$ at 250° C. of 35.

EVA was an ethylene/vinyl acetate dipolymer derived from 60 weight % ethylene and 40 weight % vinyl acetate and having a melt index of 4.0 at 190° C. with a weight of 2.16 kg.

Ionomer-1 was a terpolymer derived from 67 weight % ethylene, 24 weight % n-butyl acrylate, and 9 weight % methacrylic acid and that had been 35% neutralized with zinc.

Ionomer-2 was a dipolymer derived from 89.5 weight % ethylene and 10.5 weight % methacrylic acid that has been 71% neutralized with zinc and having a melt index of 1.1 at 190° C. with a weight of 2.16 kg.

E/MA was an ethylene/methyl acrylate copolymer derived from 24 weight % methyl acrylate and 76 weight % ethylene having a melt flow of 2.0 at 190° C. with a weight of 2.16 kg.

$SnOct_2$ was stannous octanoate.

The ingredient quantities in Tables 1 through 4 are given in weight % based on the total weight of the composition.

Comparative Examples 1-5

Each of the materials for each Comparative Example shown in Table 1 was compounded in a twin-screw extruder with the barrels and die set to about 190° C. at 200 rpm and about 30 to about 40 pounds per hour. The melt temperatures were about 225-232° C. The resulting compositions were molded into ASTM test bars and their notched Izod impact resistance was determined.

TABLE 1

|  | Comp. Ex. 1 | Comp. Ex. 2 | Comp. Ex. 3 | Comp. Ex. 4 | Comp. Ex. 5 |
|---|---|---|---|---|---|
| PLA-1 | 100 | 80 | 80 | 80 | 80 |
| E/GMA | — | 20 | — | 10 | — |
| E/BA | — | — | 20 | — | — |
| EPDM | — | — | — | 10 | — |
| Ionomer-1 | — | — | — | — | 20 |
| Notched Izod (J/m) | 31.0 | 56.6 | 68.4 | 58.2 | 79 |

Examples 1-7

Each of the materials for each Comparative Example shown in Table 1 was compounded in a twin-screw extruder with the barrels and die set to about 170° C. at 150 rpm and about 25 pounds per hour. The melt temperatures were about 205-228° C. The resulting compositions were molded into ASTM test bars and their notched Izod impact resistance was determined.

TABLE 2

|  | Ex. 1 | Ex. 2 | Ex. 3 | Ex. 4 | Ex. 5 | Ex. 6 | Ex. 7 |
|---|---|---|---|---|---|---|---|
| PLA-1 | 95 | 90 | 80 | 80 | 80 | 70 | 60 |
| EBAGMA-17 | 5 | 10 | — | — | 20 | 30 | 40 |
| EBAGMA-5 | — | — | 20 | — | — | — | — |
| EBAGMA-12 | — | — | — | 20 | — | — | — |
| Notched Izod (J/m) | 39.5 | 51.8 | 122.8 | 154.9 | 176.2 | 752.9 | 619.4 |

Examples 8-12

Each of the materials for each Example shown in Table 3 was compounded in a twin-screw extruder. The barrels and die were set to about 170° C. in the case of Examples 8 and 9 and about 180° C. in the case of Examples 10-12. The extruder operated at about 150 rpm in the case of Examples 8 and 9 and about 200 rpm in the case of Examples 10-12. Example 8 was run at about 30 pounds per hour, Example 9 at about 40 pounds per hour, Example 10 at about 30 pounds per hour, and Examples 11 and 12 at about 50 pounds per hour. The resulting compositions were molded into ASTM test bars and their notched Izod impact resistance was determined.

TABLE 3

|  | Ex. 8 | Ex. 9 | Ex. 10 | Ex. 11 | Ex. 12 |
|---|---|---|---|---|---|
| PLA-1 | 80 | 80 | 80 | 90 | 80 |
| EBAGMA-17 | 10 | 10 | 20 | — | — |
| EBAGMA-12 | — | — | — | 10 | 20 |
| EVA | 10 | — | — | — | — |
| Ionomer-1 | — | 10 | — | — | — |
| $SnOct_2$ | — | — | 0.001 | 0.001 | 0.001 |
| Notched Izod (J/m) | 154.9 | 1388.4 | 400.5 | 57.7 | 102.5 |

Examples 13-20

The compositions for the Examples shown in Table 4 were melt blended using a Werner and Pfleiderer 28D mm twin-screw extruder and cast sheets were prepared. The screw design was 780 mm long with a vent port above the 550-mm position. The screw used forward conveying elements except prior to the vent port the screw used 45 mm of kneading blocks, 114 mm of reverse elements, 30 mm of kneading blocks, and 135 mm of reverse elements under the vacuum port. The melt fed though a 25.4-cm wide flat die having a 635-micron die-gap. The melt curtain dropped about 12-cm to a chrome-plated casting drum controlled to 11° C.

The extrusion process was run at 125 rpm, barrel set points at 190° C., and the melt temperature was about 210° C. The quench drum was run at such a speed such that the amorphous cast sheet was about 380-micron thick.

In an off-line operation some of the amorphous cast sheets were converted to semi-crystalline sheets by heating them, unconstrained, in an oven at 107° C. for at least 4 hours.

Toughness of the amorphous and semi-crystalline sheets was 20 assessed using the Spencer Impact Test, ASTM Standard D 3420, using probe 6400.

TABLE 4

|  | Comp. Ex. 6 | Ex. 13 | Ex. 14 | Ex. 15 | Ex. 16 | Ex. 17 | Ex. 18 | Ex. 19 | Ex. 20 |
| --- | --- | --- | --- | --- | --- | --- | --- | --- | --- |
| PLA-2 | 100 | 99 | 95 | 83 | 99 | 95 | 91 | 95.2 | 94.7 |
| EBAGMA-5 | — | 1 | 5 | 17 | — | — | — | — | — |
| EBAGMA-12 | — | — | — | — | 1 | 5 | 9 | 1.9 | 4.7 |
| E/MA | — | — | — | — | — | — | — | 2.9 | — |
| Ionomer-2 | — | — | — | — | — | — | — | — | 0.6 |
| Amorphous Spencer Impact (g/mm) | 1500 | 2250 | 2900 | 17600 | 1740 | 3100 | 11000 | 3600 | 4300 |
| Semi-crystalline Spencer Impact (g/mm) | 3900 | 6100 | 8100 | 9500 | 4300 | 11600 | 13000 | 9900 | 11400 |

In addition to improved impact resistance, the toughened PLA compositions described herein exhibit improved tear resistance and improved flex fatigue. The sheets prepared from the compositions exhibit good clarity.

The invention claimed is:

1. A poly(hydroxyalkanoic acid) composition comprising:
   (i) about 60 to about 99.8 weight % poly(hydroxyalkanoic acid), and
   (ii) about 0.5 to about 40 weight % of an impact modifier comprising an ethylene copolymer derived from copolymerizing
   (a) about 20 to about 95 weight % ethylene;
   (b) about 3 to about 70 weight % of one or more olefins of the formula $CH_2=C(R^1)CO_2R^2$, where $R^1$ is hydrogen or an alkyl group with 1 to 8 carbon atoms and $R^2$ is an alkyl group with 1 to 8 carbon atoms; and
   (c) about 0.5 to about 25 weight % of one or more olefins of the formula $CH_2=C(R^3)CO_2R^4$, where $R^3$ is hydrogen or an alkyl group with 1-6 carbon atoms, and $R^4$ is glycidyl; wherein the weight % of the poly(hydroxyalkanoic) and the impact modifier are based on the total weight of the poly(hydroxyalkanoic acid) and the impact modifier.

2. The composition of claim 1 wherein the poly(hydroxyalkanoic acid) comprises 6-hydroxyhexanoic acid, 3-hydroxyhexanoic acid, 4hydroxyhexanoic acid, 3-hydroxyheptanoic acid, or combinations of two or more thereof.

3. The composition of claim 1 wherein the poly(hydroxyalkanoic acid) comprises hydroxyalkanoic acids having five or fewer carbon atoms.

4. The composition of claim 3 wherein the poly(hydroxyalkanoic acid) comprises glycolic acid, lactic acid, 3-hydroxypropionic acid, 2-hydroxybutyric acid, 3- hydroxybutyric acid, 4-hydroxybutyric acid, 3-hydroxyvaleric acid, 4-hydroxyvaleric acid, 5-hydroxyvaleric acid, or combinations of two or more thereof.

5. The composition of claim 4 wherein the poly(hydroxyalkanoic acid) comprises poly(glycolic acid), poly(lactic acid), polyhydroxy-butyric acid, polyhydroxybutyrate-hydroxyvalerate copolymer, copolymer of glycolic acid and lactic acid, or combinations of two or more thereof.

6. The composition of claim 5 wherein (i) is poly(lactic acid).

7. The composition of claim 6 wherein the poly(lactic acid) is present about 60 to about 97 weight % and the impact modifier is present about 3 to about 40 weight %.

8. The composition of claim 4 wherein (a) is present about 40 to about 90 weight %.

9. The composition of claim 7 wherein (a) is present about 50 to about 80 weight %.

10. The composition of claim 4 wherein (b) is about 20 to about 35 weight % of one or more olefins of the formula $CH_2=C(R^1)CO_2R^2$, $R^1$ is hydrogen or an alkyl group with 1-8 carbon atoms, and $R^2$ is an alkyl group with 1-8 carbon atoms.

11. The composition of claim 4 wherein (c) is about 3 to about 17 weight % of at least one olefin of the formula $CH_2=C(R^3)CO_2R^4$, where $R^3$ is hydrogen or an alkyl group with 1-6 carbon atoms, and $R^4$ is glycidyl.

12. The composition of claim 7 wherein the ethylene copolymer is further derived from copolymerizing the carbon monoxide.

13. The composition of claim 9 wherein (b) is butyl acrylate and (c) is glycidyl methacrylate.

14. The composition of claim 10 wherein the impact modifier further comprises from about 0.5 to about 75 weight % of one or more ionomers, based on the total weight of the impact modifier.

15. The composition of claim 13 wherein the impact modifier further comprises 10 to 50 weight % of one or more ionomers, based on the total weight of the impact modifier.

16. The composition of claim 7 wherein the impact modifier further comprises up to about 90 weight % of one or more copolymers of ethylene and an acrylate ester or vinyl acetate, based on the total weight of the impact modifier.

17. The composition of claim 13 wherein the impact modifier further comprises up to about 50 weight % of one or more copolymers of ethylene and an acrylate ester or vinyl acetate, based on the total weight of the impact modifier.

18. The composition of claim 1 further comprising one or more cationic catalysts including salts of hydrocarbon mono-, di-, or polycarboxylic acids.

19. The composition of claim 11 further comprising one or more cationic catalysts including stannous octanoate, zinc stearate, zinc diacetate, or combinations of two or more thereof.

20. An article comprising the composition of claim 1 wherein the article is molded article, extruded article, thermoformed article, or combinations of two or more thereof.

* * * * *